UNITED STATES PATENT OFFICE.

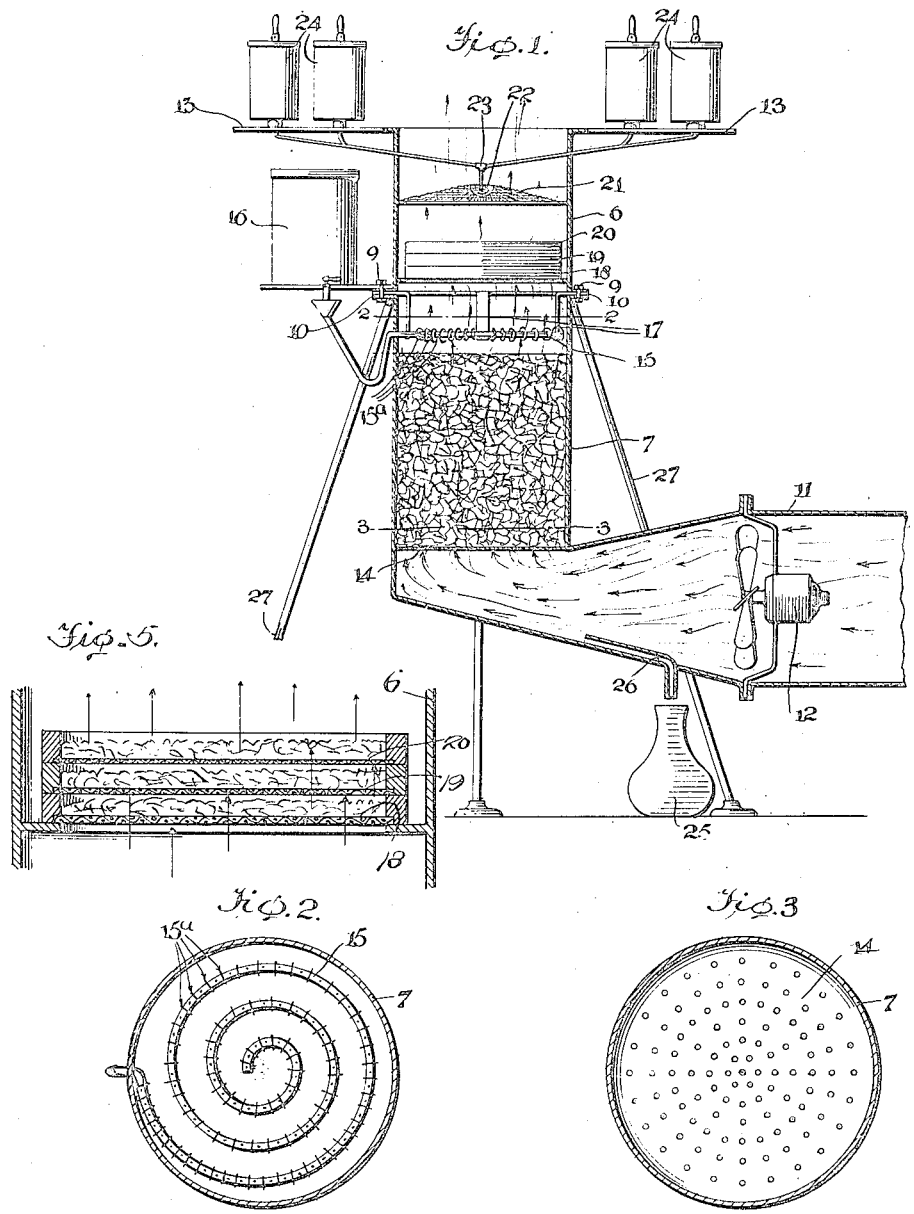

CHARLES DOBBS AND ALBERT E. PAINTER, OF RENO, NEVADA.

APPARATUS FOR DRYING AND MEDICATING AIR.

1,409,364. Specification of Letters Patent. Patented Mar. 14, 1922.

Application filed January 20, 1921. Serial No. 438,792.

*To all whom it may concern:*

Be it known that we, CHARLES DOBBS and ALBERT E. PAINTER, citizens of the United States, and residents of Reno, in the county of Washoe and State of Nevada, have invented certain new and useful Improvements in Apparatus for Drying and Medicating Air, of which the following is a specification.

This invention relates to an improved apparatus for dehydrating air and for adding to the same certain medicaments, disinfectants or the like.

It is a well known fact that dry pure air is especially beneficial to the successful treatment of certain diseases of the respiratory organs, such as asthma, hay fever, catarrh, tuberculosis and kindred ailments, and that among most successful method of treating such diseases is by the inhalation of various medicated vapors.

Further, it is often desirable to introduce into a room or other closed chamber, certain gaseous vapors having disinfecting and fumigating properties or for scenting or perfuming the air passing into such chambers.

An object of the present invention is to provide an apparatus for drying and medicating air, wherein the air forced through said apparatus is treated to remove the moisture and other noxious ingredients therefrom, and to introduce into the same various medicaments having certain curative and other beneficial and desirable properties.

A further object of the invention is to provide a device of the above mentioned character having a novel means for dehydrating and purifying the air, and for mixing with the same certain medicaments or disinfectants as the air is forced through the apparatus.

A still further object of this invention is to provide a device of the above mentioned character which is simple in construction, reliable in operation, and highly efficient in the purpose for which designed.

In the accompanying drawings forming a part of this specification and in which like numerals are employed to designate like parts throughout the several views, Figure 1 is a vertical sectional view of the improved apparatus, Figure 2 is a transverse sectional view on the line 2—2 of Figure 1, Figure 3 is a transverse sectional view on the line 3—3 of Figure 1, showing the perforate partition, and Figure 4 is an enlarged sectional view of the liquid distributing screen.

Figure 5 is an enlarged sectional view of the series of screens of varying mesh.

Referring to the drawings, wherein for the purpose of illustration is shown a preferred embodiment of the invention, the numerals 6 and 7 represent respectively the upper and lower portion of an upright shell, or hollow cylinder, said sections being joined by means of the bolts or rivets 9 passing through the annular flanges 10, whereby the sections are held in fixed relation. The bottom of the hollow cylinder terminates in the outwardly projecting pipe or hollow casing 11 within which is transversely mounted a power driven fan 12 for drawing air into and forcing the same through the hollow upright cylinder. Upper section 6 is open at its top and is provided with radially extending shelves 13.

Placed within the hollow cylinder near the bottom thereof is a perforate partition 14, supporting thereon a suitable depth of coke, pebbles or the like. Above this porous mass is arranged a liquid distributing pipe preferably in the form of a flat helical coil 15, having on its upper side a series of perforations or apertures with a fixed ring or baffle 15ª arranged transversely of the pipe between each of said apertures to insure a uniform drip. Liquid is fed to the distributing pipe from a valve controlled container 16 supported on a shelf supported by clamping bolts 9. The flat coiled perforated pipe 15 is suspended from a plurality of brackets 17 fastened between the annular flanges 10.

Arranged above the liquid distributing pipe 15 is a series of wire screens 18, 19 and 20, carried in suitable frames and having meshes preferably decreasing in size from the first or lowermost screen to the last or uppermost screen. On each of said screen surfaces is supported a porous layer of lime or other dehydrating compound. Above this bank of screen trays is supported a conical screen or reticulated partition 21, having at its apex an imperforate cup or depression 22. Various disinfectants or medicaments are fed to the cup 22 from the supply pipe 23, which is fed from a number of valve controlled containers 24 supported on the shelves 13.

The inner sides of the lower casing 7 and air passage 11 are preferably lined with lead or other material impervious to the action of various acids, and any liquid trickling or passing downwardly through the device is drawn off into a suitable receptacle 25 through the covered discharge opening 26. The entire apparatus is supported by a frame or stand 27, the upper ends of which engage the casing beneath the annular flanges 10 for holding the entire apparatus in an upright operative position.

In the operation of the improved device, the air drawn into and forced through the apparatus by the power driven fan 12, enters below the perforate plate 14 and passes up through the mass of coke, pebbles or the like supported on said perforate plate. A suitable dehydrating liquid, as for example, sulphuric acid, is fed from the receptacle 16 to the perforate coil pipe 15 and escapes through the openings in the upper side thereof. The liquid escaping through these openings strikes the transverse baffles or rings 15a and drips upon the porous mass below. It is thus evident that, regardless of the inclination of the coil pipe 15, the liquid is equally distributed over the entire porous mass. As the air passes through the porous mass, it meets on the way the sulphuric acid or other dehydrating solution which is constantly discharging from the distributing pipe 15 and trickling or filtering down through the porous mass of coke, pebbles or the like. The effect is to remove the moisture, dust and noxious vapors combined in the air.

This air then passes through the reticulate screens or sieves 18, 19 and 20 through the respective porous layers or lime contained thereon, where further dehydration is effected and where any particles of dirt or other impurities suspended in the air are removed or filtered therefrom. It is thus seen that the screen surfaces serve not only to remove solid particles contained in the air, but also serve as supporting pans or trays for containing a porous mass of lime or the like, which intercepts any sulphuric acid or other moisture which may have passed through the porous mass below the distributing pipe 15.

Various medicaments, perfumes, or disinfectants are contained inth valve controlled containers 24 and are fed and mixed through pipe 23 into the cup or depression 22. As the cup 22 overflows the liquid flows over the brim thereof and covers the entire conical screen 21 with a relatively thin layer of the solution. As the air is forced upwardly and through the reticulate conical screen 21, it co-mingles with the liquid on the screen and passes into the room in the form of a dry, medicated or scented vapor. Any liquid which is not vaporized by the air passing through the apparatus flows off through the outlet 26 and into the receptacle 25, but by properly regulating the flow of the liquids from the valve controlled containers practically all of such liquids are vaporized.

It is thus seen that we provide a highly efficient device, and one that is applicable to a variety of uses. By supplying the receptacles 24 with various medicaments, such as oil of camphor, oil of pine, menthol and the like, the dry air is treated with such substances and in its nascent state has certain curative properties highly beneficial in the treatment of certain ailments. Further, various liquid chemicals, natural or artificial, may be employed to perfume or scent the air with the fragrance of flowers or blossoms. The device is also useful for disinfecting and fumigating purposes, as by employing certain chemicals having disinfecting and fumigating properties, such as formaldehyde, carbolic acid or the like, very satisfactory results are obtained.

It is to be understood that the form of this invention herewith shown and described is to be taken as a preferred example of the same, and that various changes in the shape, size and arrangement of parts may be resorted to without departing from the spirit of the invention or scope of the subjoined claims.

Having thus described the invention, we claim:

1. A hollow casing forming an air passage, a porous mass within the casing and through which the air passes, means within the casing for supplying fluid into the air subsequent to the passage through the porous mass, and air filtering means arranged in the casing between the porous mass and liquid supplying means.

2. A hollow casing forming an air passage, a porous mass within the casing and through which the air passes, means for distributing a liquid over and through said porous mass, means within the casing for supplying liquid into the air subsequent to the passage through the porous mass, and air filtering and dehydrating means arranged within the casing between the porous mass and liquid supplying means.

3. A hollow casing forming an air passage, a perforate partition near the bottom and within said casing, a porous mass supported on said perforate partition, means for distributing a liquid over and through said porous mass, means within the casing for supplying liquid into the air subsequent to the passage through the porous mass, and a series of superimposed screens arranged within the casing between the porous mass and liquid supplying means and supporting on the respective screen surfaces a layer of porous material.

4. An apparatus of the character described, comprising a hollow upright casing, a perforate partition near the bottom and within the casing, a porous mass supported on said partition, filtering screens above said porous mass, a liquid distributing screen above said filtering screens, means for covering said liquid distributing screen with a relatively thin film of liquid, and means for forcing a current of air through said casing.

5. An apparatus of the character described, comprising a hollow upright casing, a perforate partition near the bottom and within the casing, a porous mass supported on said partition, means for distributing a liquid over and through said porous mass, filtering screens above said distributing means and supporting on their screen surfaces porous layers of a dehydrating compound, a liquid distributing screen above said filtering screens, means for covering said distributing screen with a relatively thin layer of liquid, and means for forcing a current of air through said casing.

6. An apparatus of the character described, comprising a porous mass, means for distributing moisture to said porous mass, a filter in advance of said moisture distributing means, and a second moisture distributing means in advance of said filter.

7. An apparatus of the character described, comprising a porous mass, means for distributing moisture to said porous mass, a series of reticulate screens in advance of said moisture distributing means and having on their respective layers of screening a porous mass of a dehydrating compound, and a second moisture distributing means in advance of said screens.

8. An apparatus of the character described, comprising an upright casing, a perforate partition near the bottom and within said casing, a porous mass supported on said partition, a perforate distributing pipe transverse of said casing above the porous mass, means for supplying said pipe with a liquid for distribution over and through said porous mass, a series of screens above said distributing pipe, a liquid distributing screen above said screens, and means for covering the surface of said distributing screen with a liquid.

9. A hollow casing forming an air passage; a porous mass within the casing and through which air passes; a flat helical distributing coil arranged above the porous mass transverse the casing and having perforations through its upper side; means for feeding a liquid through said distributing coil and onto the porous mass; a series of screens arranged above the distributing coil; said screens being placed in superimposed relation and supporting on the respective screen surfaces a porous mass; a liquid distributing screen arranged above said series of screens; and means for feeding a number of liquids over the surface of said screen.

10. A hollow casing forming an air passage; a porous mass within the casing; a substantially flat, helical liquid distributing coil arranged transverse the casing above the porous mass, and having perforations through its upper side and having arranged between each of such perforations a transverse baffle; means for feeding a liquid through said distributing coil and onto said porous mass; a series of screens arranged above said distributing coil, said screens being placed in superimposed relation and having meshes preferably decreasing in size from the first or lowermost screen to the last or uppermost screen and supporting on the respective screen surfaces a porous layer; a liquid distributing screen arranged above said series of screens; and means for feeding a number of liquids over the surface of said screen.

11. An apparatus of the character described, comprising a hollow upright casing, a transverse perforate partition arranged near the bottom and within said casing, a porous mass supported on said partition, means for spraying a liquid over and through said mass, a series of screens arranged above said spray, a conical screen arranged above said series of screens, and having at its apex an imperforate cup like depression, means for feeding liquids to the cup-like depression to cause the same to overflow and to cover the sides of said conical screen, and means for forcing a current of air upwardly through the various layers contained in the casing.

12. A hollow casing forming an air passage, a porous mass within the casing, a flat helical coil above said porous mass having a series of perforations through the upper side thereof, a baffle arranged transversely between each perforation in the pipe, means without the casing for supplying liquid to said helical coil to drip over and through the porous mass, brackets supporting said helical coil in a position above the porous mass and transverse the casing, a series of filtering screens arranged transverse the casing above the helical coil, a layer of porous material supported on the respective screen surfaces, a conical liquid distributing screen arranged above the series of screens and transverse the casing near the top thereof, said conical screen having at its apex an imperforate cup-like depression, a liquid feed pipe for overflowing said cup-like depression, a plurality of valve controlled containers arranged near the top of said casing for supplying the feed pipe with different liquids, and means for forcing a current of air upwardly through the various layers contained within the casing.

13. An apparatus of the character described, comprising a substantially L-shaped casing having a vertical and a horizontal portion, a fan in the lower horizontal portion spaced from the lower end of the vertical portion, means within the vertical portion for dehydrating, filtering and medicating the air forced through the casing, including means through which liquid percolates, a drain in the horizontal portion between the fan and the lower end of the vertical portion to carry off the surplus liquid.

14. An apparatus of the character described, comprising a hollow substantially L-shaped casing having a vertical and horizontal portion and having at the upper end of its vertical portion an outwardly extending annular flange; a separable hollow section arranged above the vertical section and having at its lower open end an outwardly extending annular flange secured to the annular flange of the lower section; a fan supported within the casing near the outer end of the horizontal section for forcing air through the sectional casing; means within the vertical section of the casing for dehydrating, purifying and medicating air; and a supporting frame engaging the casing beneath the annular flange of the lower section for retaining the apparatus in an upright operative position.

CHARLES DOBBS.
ALBERT E. PAINTER.